March 17, 1925.
A. P. T. BROOKE
1,530,295
SIDE CAR ATTACHMENT TO MOTOR CYCLES
Filed Aug. 7, 1922
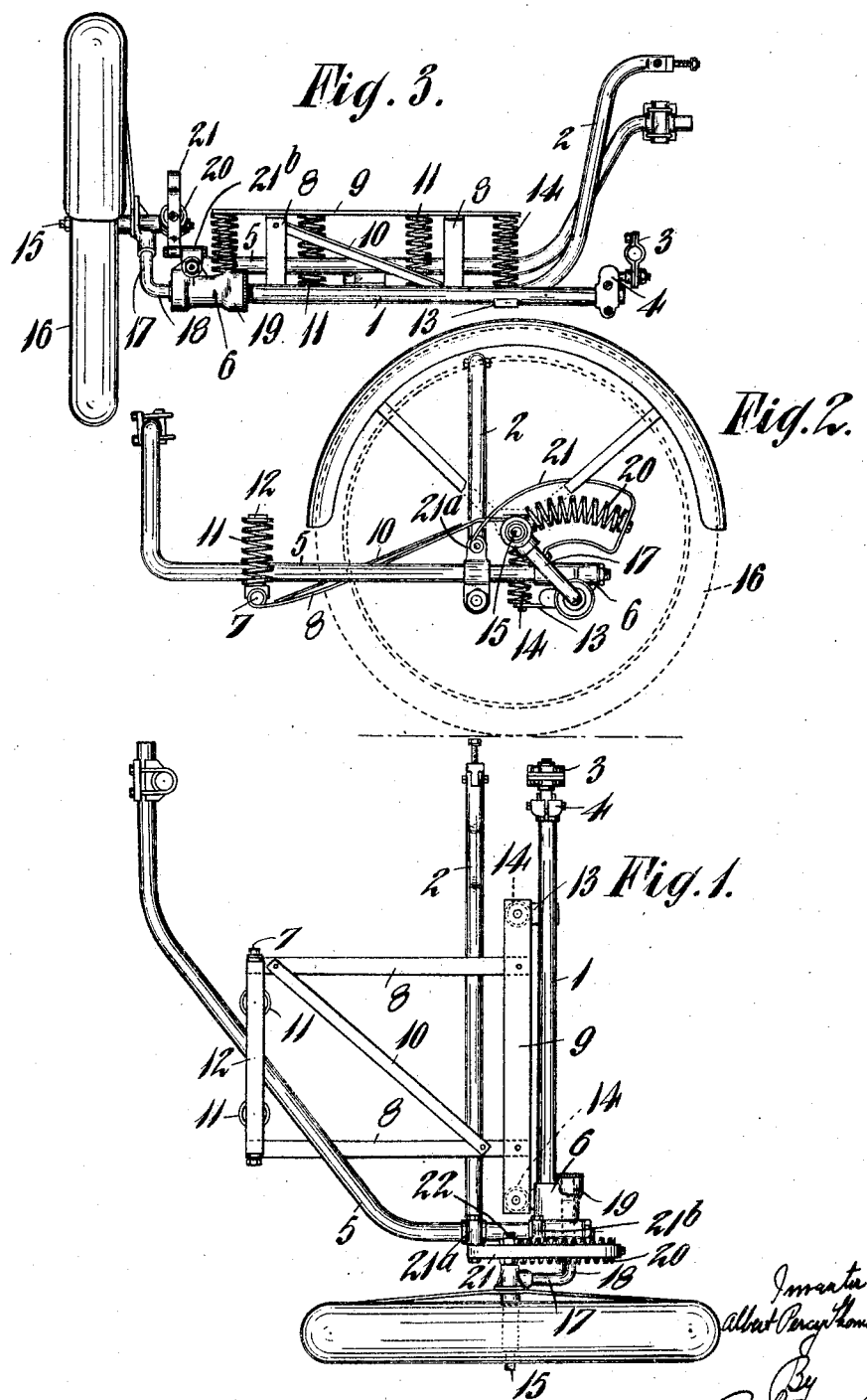

Patented Mar. 17, 1925.

1,530,295

UNITED STATES PATENT OFFICE.

ALBERT PERCY THOMAS BROOKE, OF AUBURN, VICTORIA, AUSTRALIA.

SIDE-CAR ATTACHMENT TO MOTOR CYCLES.

Application filed August 7, 1922. Serial No. 580,175.

*To all whom it may concern:*

Be it known that ALBERT PERCY THOMAS BROOKE, a subject of the King of Great Britain, residing at 118 Victoria Road, Auburn, in the State of Victoria, Commonwealth of Australia, has invented certain new and useful Improvements Relating to Side-Car Attachments to Motor Cycles, of which the following is a specification.

The present invention relates to side car attachments to motor cycles and in particular to spring suspension means for absorbing road shocks imparted to the wheel with resultant comfort to the occupant of the car.

One of the principal features of the invention consists in mounting the wheel on a spring controlled crank axle partly rotatable in a bearing on the chassis which permits the wheel to swing with said crank axle under road shocks and minimizes shock to the chassis.

A practical form of the invention is depicted in the accompanying drawings whereof:—

Fig. 1 is a plan of the attachment.

Fig. 2 a side elevation with position of wheel indicated in broken lines and,

Fig. 3 a rear elevation.

Referring to these drawings it will be seen that the chassis of the attachment comprises two bars or tubes 1, 2 which project approximately at right angles from the side of the cycle frame (not illustrated), the rearmost tube 1 being approximately horizontal and pivoted to the bracket 3 which is fixed to the cycle frame by means of a ball joint 4 at its inner end, and the foremost tube 2 being bent upwardly at its inner end which is fixed also to the frame. The outer ends of these tubes are connected with another tube 5 at the outer side of the attachment, the rear end of the tube 5 and outer end of the tube 1 being fitted in a casting 6, and said tube 5 being bent and extended diagonally forward and then upwardly to the cycle frame. Fixed to this diagonal tube is a transverse bar 7 to which is fixed a rearwardly extending skeleton frame to support the car.

This frame includes two longitudinal and forwardly downwardly inclined bars 8 fixed at their forward ends to the transverse bar 7 and at their rearward or raised ends to a transverse bar 9, the bars 7, 8 and 9 forming a rectangular frame which is braced against lateral play by means of a diagonal brace 10 fixed to the side members 8.

Fixed to the bar 7 are helical springs 11 supporting a transverse bar 12, and fixed to projecting lugs 13 on the chassis member 1 are similar springs 14 supporting the transverse bar 9.

The car body is bolted to these transverse bars 12 and 9 and is therefore cushioned on the springs. The axle 15 of the wheel 16 is fixed to the crank arm 17 of a short crank axle 18 journalled in a long sleeve bearing 19 formed in the casting 6 and arranged parallel with the wheel axle, said bearing containing ball races at its ends.

Fixed to the inner end of the wheel axle 15, on the crank arm 17, is a helical spring 20 which, according to the illustrated example, extends rearwardly and is fixed at its rear end to a rigid frame or abutment 21, the forward end of which latter is attached to a bracket 21ª held to the bar 5 of the chassis. The rear end of said frame 21 is also fixed to the bar 5 by means of a bracket 21ᵇ.

Preferably the spring curves to a radius corresponding with that of the arc of movement of the crank axle, and the frame 21 is in the form of a shroud to partially enclose the spring being curved to correspond thereto, the spring being fixed at its forward end by a bolt 22 to the wheel axle 15.

The spring 20 effects pressure on the axle 15 of the wheel and maintains the latter in normal running position, and when said wheel is struck by a road obstruction the crank axle 18 turns in the bearing 19 and the shock is absorbed by the spring which compresses against the abutment 21 and subsequently relaxes so that the wheel resumes its normal position, thus the chassis of the attachment is relieved of any considerable shock.

I claim:—

1. In side car attachments to motor cycles, a combination of a chassis, a sleeve bearing thereon, a crank axle partially rotatable in said bearing, a wheel mounted on an end of the axle, and a spring mounted to control the axle in its partial rotation and a frame fixed to the chassis and in which said spring is arranged, one end of said spring being secured to the axle and the other end being secured to said frame.

2. In side car attachments to motor cycles, a chassis having transverse bars, springs on the foremost and rearmost of said bars, car supporting bars on said springs, inclined side bars fixed to the rearmost car supporting bar and to the foremost transverse chassis bar, and a diagonal brace connecting said side bars.

3. In side car attachments to motor cycles, a chassis comprising two parallel transversely extending bars one forward of the other, a forwardly extending diagonal bar joined to the forward parallel bar, a casting comprising a sleeve bearing fitted to the rear end of the diagonal bar and to one end of the rear parallel bar, a crank axle mounted for partial rotation in said sleeve bearing, a wheel mounted on an end of the axle and a spring mounted to control the axle and its partial rotation.

Dated this 8th day of June, 1922.

ALBERT PERCY THOMAS BROOKE.